US011151483B2

(12) United States Patent
Panday et al.

(10) Patent No.: US 11,151,483 B2
(45) Date of Patent: Oct. 19, 2021

(54) SYSTEM AND A METHOD FOR ASSESSING DATA FOR ANALYTICS

(71) Applicant: Cognizant Technology Solutions India Pvt. Ltd., Chennai (IN)

(72) Inventors: Mrityunjoy Panday, Kolkata (IN); Nagarajan Kumar, Mooresville, NC (US)

(73) Assignee: COGNIZANT TECHNOLOGY SOLUTIONS INDIA PVT. LTD, Chennai (IN)

( * ) Notice: Subject to any disclaimer, the term of this patent is extended or adjusted under 35 U.S.C. 154(b) by 439 days.

(21) Appl. No.: 16/400,499

(22) Filed: May 1, 2019

(65) Prior Publication Data

US 2020/0349480 A1    Nov. 5, 2020

(51) Int. Cl.
*G06F 16/242*     (2019.01)
*G06Q 10/06*      (2012.01)
*G06F 16/2458*    (2019.01)

(52) U.S. Cl.
CPC ......... *G06Q 10/063* (2013.01); *G06F 16/244* (2019.01); *G06F 16/2465* (2019.01)

(58) Field of Classification Search
CPC .. G06Q 10/063; G06F 16/244; G06F 16/2465
See application file for complete search history.

(56) References Cited

U.S. PATENT DOCUMENTS 7,412,429 B1 *  8/2008  Syeda-Mahmood ........................ G06K 9/6273
  706/45

2016/0092493 A1 *  3/2016  Ko ..................... G06F 16/24532
  707/693

OTHER PUBLICATIONS

Song et al. "PAMAE: Parallel k-Medoids Clustering with High Accuracy and Efficiency", 2017, ACM. (Year: 2017).*
O.F. Ertugrul, "A novel approach for extracting ideal exemplars by clustering for massive time-ordered datasets", 2016, Turkish Journal of Electrical Engineering & Computer Sciences. (Year: 2016).*
Chanchal Yadav, "Algorithm and approaches to handle large Data A Survey", IJCSN International Journal of Computer Science and Network, vol. 2, Issue 3, 2013, ISSN (Online): 2277-5420.

(Continued)

*Primary Examiner* — Apu M Mofiz
*Assistant Examiner* — Sheryl L Holland
(74) *Attorney, Agent, or Firm* — Cantor Colburn LLP (57) ABSTRACT

A System and a Method for Assessing Data for Analytics A system and a method for assessing readiness of data for data science and analytics is disclosed. The present invention quantifies readiness of data by providing a data insight quotient (DIQ). In particular, a nucleus of a dataset retrieved from an enterprise database is derived. The dataset is representative of data collected for a predefined objective over a period of time and includes a plurality of features and records. Further, a plurality of time-ordered datasets are generated by dividing the retrieved dataset based on a selected time series. A nucleus is derived for each of the time-ordered dataset. Furthermore, relevancy and redundancy of each of the plurality of time-ordered datasets is evaluated. The present invention, further computes the complexity and noise associated with each of the time-ordered datasets. Finally, a DIQ value for each time-ordered dataset is evaluated as a function of relevancy, complexity, noise and redundancy.

15 Claims, 4 Drawing Sheets

(56) References Cited

OTHER PUBLICATIONS

Data Management and use: Governance in the 21st century, The British Academy, The Royal Society, 2017.

Key Performance Indicators (KPIs), Internet: URL: https://www.ibm.com/support/knowledgecenter/en/SSWSR9_11.0.0/c . . . , IBM, 2013.

Marcus Thorström, "Applying machine learning to key performance indicators", Master's thesis in Software Engineering, Department of Computer Science and Engineering, University of Gothenburg Gothenburg, Sweden 2017.

Martin Goodson, "Preparing Your Dataset for Machine Learning: 8 Basic Techniques That Make Your Data Better", Internet: https://www.altexsoft.com/blog/datascience/preparing-your-dataset-for-machine-learn . . . , Jun. 16, 2017.

Master Data Management KPI list, Quantitative and Qualitative KPI, Internet: URL: https://www.assessteam.com/master-data-management-kpi-list/, Assess Team, 2018.

Nehaya Sultan, "Data Mining Approach for Detecting Key Performance Indicators", Journal of Artificial Intelligence, vol. 10 (2): 59-65, 2017, Internet: https://scialert.net/fulltextmobile/?doi=jai.2017.59.65.

Nikat Parveen, "Data processing for large database using feature selection", 2017 2nd International Conference on Computing and Communications Technologies (ICCCT), Internet, URL: https://ieeexplore.ieee.org/document/7972294.

Thomas Ravn, "Measuring and Monitoring the Quality of Master Data", 2008, Platon, p. 1-7.

\* cited by examiner

SYSTEM AND A METHOD FOR ASSESSING DATA FOR ANALYTICS

FIELD OF THE INVENTION

The present invention relates generally to the field of data science and analytics. More particularly, the present invention relates to a system and a method for assessing data for data science and analytics by quantifying readiness.

BACKGROUND OF THE INVENTION

Data science and analytics are data driven and involve working with large complex datasets. Generally, preparation of large complex dataset is based on "more is better" principle and includes collection of extensive amount of data which may further include new useful information and redundant information. Working with extensive amount of data not only increases storage complexity and computational complexity of the systems but also degenerates performance of the system if the prepared dataset includes irrelevant, redundant and noisy information. Further, having knowledge regarding readiness of data can reduce deployment time and realize planned ROI from predictive modelling exercises. Therefore, it is essential to gather some insight on readiness of the large complex datasets before using for data science and analytics. However, currently a measure to quantify readiness of data does not exist, thereby, leading to collection of irrelevant data and increase in infrastructure and maintenance cost.

In light of the above drawbacks, there is a need for a system and a method which assesses readiness of data to prevent unnecessary analytics. Further, there is a need for a system which optimizes data gathering for use in data science and analytics and prevents collection of irrelevant and redundant data. Further, there is a need for a system and a method which reduces data management effort and time. Furthermore, there is a need for a system and a method which can be easily deployed and maintained.

SUMMARY OF THE INVENTION

In various embodiments of the present invention, a method for assessing readiness of data for data science and analytics is provided. The method is implemented by at least one processor executing program instructions stored in a memory. The method comprises deriving, by the processor, a nucleus associated with a dataset and a plurality of time-ordered datasets respectively. Each nucleus is representative of minimum number of relevant records and features of corresponding dataset. The method further comprises evaluating, by the processor, a redundancy value and a relevancy value of each of the plurality of time-ordered datasets. Further, the method comprises evaluating, by the processor, complexity and noise associated with each of the plurality of time-ordered datasets. Furthermore, the method comprises evaluating, by the processor, a data insight quotient (DIQ) value for each of the plurality of time-ordered datasets as a function of the relevancy, the redundancy, the complexity and the noise associated with corresponding datasets. Finally the method comprises determining, by the processor, readiness of each of the plurality of time-ordered datasets based on the DIQ value, where readiness of data is representative of ability of data for performing analytics to derive desired results.

In various embodiments of the present invention, a system for assessing readiness of data for data science and analytics is provided. The system comprises a memory storing program instructions, a processor configured to execute program instructions stored in the memory, and a data assessment engine in communication with the processor. The system is configured to derive a nucleus associated with a dataset and a plurality of time-ordered datasets respectively. Each nucleus is representative of minimum number of relevant records and features of corresponding dataset. Further, the system is configured to evaluate a redundancy value and a relevancy value of each of the plurality of time-ordered datasets. Furthermore, the system is configured to evaluate a complexity and noise associated with each of the plurality of time-ordered datasets. Yet further, the system is configured to evaluate a data insight quotient (DIQ) value for each of the plurality of time-ordered datasets as a function of the relevancy, the redundancy, the complexity and the noise associated with corresponding datasets. Finally, the system is configured to determine readiness of each of the plurality of time-ordered datasets based on the DIQ value, where readiness of data is representative of ability of data for performing analytics to derive desired results.

In various embodiments of the present invention, a computer program product is provided. The computer program product comprises a non-transitory computer-readable medium having computer-readable program code stored thereon, the computer-readable program code comprising instructions that, when executed by a processor, cause the processor to derive a nucleus associated with a dataset and a plurality of time-ordered datasets respectively. Each nucleus is representative of minimum number of relevant records and features of corresponding dataset. Further, a redundancy value and a relevancy value of each of the plurality of time-ordered datasets is evaluated. Furthermore, a complexity and noise associated with each of the plurality of time-ordered datasets is evaluated by using a principle graph and manifold technique on each of the nucleus derived from corresponding time-ordered datasets. Yet further, a data insight quotient (DIQ) value for each of the plurality of time-ordered datasets is evaluated as a function of the relevancy, the redundancy, the complexity and the noise associated with corresponding datasets. Finally readiness of each of the plurality of time-ordered datasets is determined based on the DIQ value, where readiness of data is representative of ability of data for performing analytics to derive desired results.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

The present invention discloses a system and a method for assessing readiness of data for data science and analytics. In particular, the system and method of the present invention quantifies readiness of data by providing a data insight quotient (DIQ). The value of DIQ associated with the data is representative of readiness of data for data science and analytics. Furthermore, readiness of data is representative of ability of data for performing descriptive, diagnostic, predictive and prescriptive analytics to derive desired results. In operation, the present invention provides for deriving a nucleus of a dataset retrieved from an enterprise database. The dataset is representative of data collected for a predefined objective over a period of time and includes a plurality of features and records. The nucleus is representative of minimum number of records and features of a dataset. A plurality of time-ordered datasets are generated by further dividing the retrieved dataset based on a selected time series. A nucleus is derived for each of the time-ordered dataset. Further, relevancy and redundancy of each of the plurality of time-ordered datasets is evaluated. The system and method of the present invention, further computes the complexity and noise associated with each of the time-ordered datasets. Finally, a DIQ value for each time-ordered dataset is evaluated as a function of relevancy, complexity, noise and redundancy.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
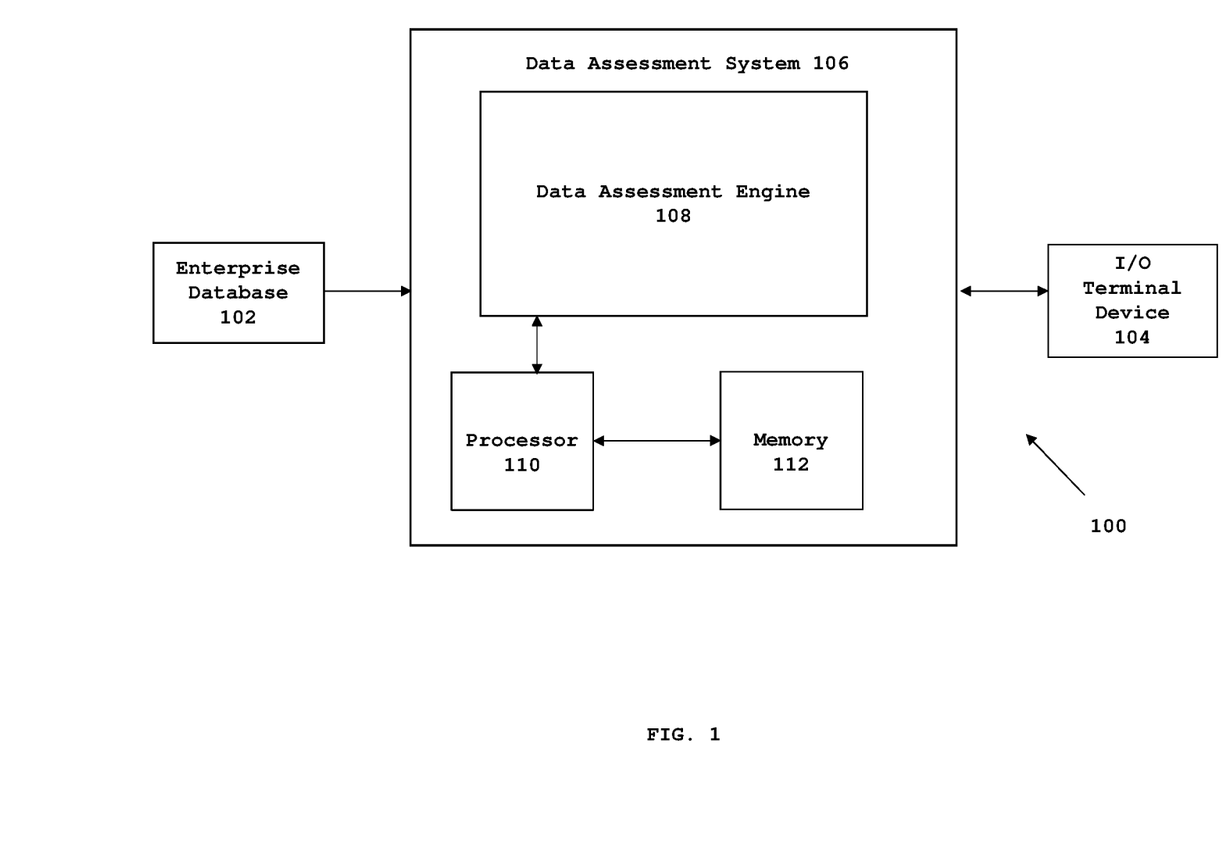
FIG. 1 illustrates a block diagram of a system for assessing readiness of data for data science and analytics, in accordance with an embodiment of the present invention.

FIG. 1 illustrates a block diagram of a system for assessing readiness of data for data science and analytics, in accordance with an embodiment of the present invention.

Referring to FIG. 1, in an embodiment of the present invention, a production environment 100 is illustrated which comprises an enterprise database 102, an input/output (I/O) terminal device 104 and a system for assessing readiness of data for data science and analytics hereinafter referred to as a data assessment system 106.

In various embodiments of the present invention, the enterprise database 102 comprises data collected for a predefined objective over a period of time. The collected data is maintained as a dataset. Further, the dataset includes a plurality of features and records associated with the predefined objective. In an exemplary embodiment of the present invention, the dataset is a flat-dataset. In another embodiment of the present invention, the enterprise database 102 may be maintained in a storage remote to the data assessment system 106. In an exemplary embodiment of the present invention, the enterprise database 102 may be a part of a client computing device (not shown). Examples of client computing device may include, but are not limited to, laptop, desktop, supercomputer, microcomputer or any other wired or wireless device capable of executing instructions. In an exemplary embodiment of the present invention, the dataset is associated with loan applications and includes a plurality of features and records associated with the loan approval and amount approved.

In various exemplary embodiments of the present invention, the input/output (I/O) terminal device 104 may include, but is not limited to, a touchscreen display, microcomputer or any other wired or wireless device capable of receiving inputs and displaying output results. In an exemplary embodiment of the present invention, the I/O terminal device 104 is configured to view one or more processing and computation results generated by the data assessment system 106.

In an exemplary embodiment of the present invention, the data assessment system 106 may be a hardware device. In another exemplary embodiment of the present invention, the data assessment system 106 may be a software device. In yet another exemplary embodiment of the present invention, the data assessment system 106 is a combination of hardware and software. In an embodiment of the present invention, as shown in FIG. 1, the data assessment system 106 interfaces with the enterprise database 102 and the I/O terminal device 104. The data assessment system 106 interfaces with the enterprise database 102 to retrieve dataset. The data assessment system 106 may interface with the enterprise database 102 over a communication channel (not shown). In an embodiment of the present invention, examples of the communication channel may include a physical transmission medium, such as, a wire, or a logical connection over a multiplexed medium, such as, a radio channel in telecommunications and computer networking. The examples of radio channel in telecommunications and computer networking may include a Local Area Network (LAN), a Metropolitan Area Network (MAN), and a Wide Area Network (WAN). In an embodiment of the present invention, the data assessment system 106 interfaces with the I/O device 104 to receive inputs such as selection of database, selection of datasets, selection of a time series or any other input and output results associated with the readiness of the dataset.

In another embodiment of the present invention, the data assessment system 106 may be implemented in a cloud computing architecture in which data, applications, services, and other resources are stored and delivered through shared data-centers. In an exemplary embodiment of the present invention, the functionalities of the data assessment system 106 are delivered as software as a service (SAAS).

In another embodiment of the present invention, the data assessment system 106 may be implemented as a client-server architecture, wherein a client terminal device (not-shown) accesses a server hosting the system 106 over a communication channel (not shown).

Further, the data assessment system 106 comprises a data assessment engine 108, a processor 110 and a memory 112. The data assessment engine 108 is operated via the processor 110 specifically programmed to execute instructions stored in the memory 112 for executing functionalities of the system 106 in accordance with various embodiments of the present invention. In various embodiments of the present invention, the data assessment engine 108 is configured to analyze complex datasets, generate time-ordered datasets, derive data nucleus, and evaluate relevancy, redundancy, complexity and noise for the time-ordered datasets. Further, the data assessment engine 108 evaluates a data insight quotient (DIQ) for each of the time-ordered datasets. The value of DIQ associated with each dataset is representative of the readiness of the dataset for data science and analytics.

In operation, the data assessment engine 108 is configured to retrieve the dataset from the enterprise database 102. Further, the data assessment engine 108 analyses the dataset to compute a period of collection of the data. The period of collection of the data is representative of the overall time frame for which the data is collected. Further, the data assessment engine 108 generates a plurality of time-ordered datasets by dividing the retrieved dataset based on a selected time series. For E.g.: if the dataset is prepared over a period of 1 year, the dataset may be divided into 12 datasets based on the month of preparation of the dataset. In an exemplary embodiment of the present invention, the time series may be selected via the input/output terminal device 104.

The data assessment engine 108 is further configured to derive a nucleus of the entire dataset as retrieved from the enterprise database 102. The nucleus is representative of minimum number of relevant records and features of the dataset. In particular, the nucleus is representative of smallest subset of records and features that preserves the information in the dataset. The nucleus derived from the entire dataset minimizes storage and computational complexity, and hence reduces the turnaround time for each modelling exercise which is performed after the dataset is approved for further analysis based on DIQ value.

Further, the data assessment engine 108 is configured to derive a nucleus of each of the plurality of time-ordered datasets. In operation, the data assessment engine 108 derives the nucleus of the entire dataset and each of the time-ordered datasets by using a combination of unsupervised feature selection technique and an optimal sampling technique. In an exemplary embodiment of the present invention, the data assessment engine 108 uses the unsupervised feature selection technique to minimize the number of features in the entire dataset and each of the plurality of time ordered datasets. In the exemplary embodiment of the present invention, where the dataset is associated with loan applications, the dataset includes 74 features associated with the loan approval and amount approved. The data assessment engine 108 uses an unsupervised feature selection technique to identify 51 minimum relevant features.

In an embodiment of the present invention, the data assessment engine 108 uses the optimal sampling technique to minimize the number of records in the entire dataset and each of the plurality of time ordered datasets. In an exemplary embodiment of the present invention, the data assessment engine 108 computes an integer (K) using K Medoid clustering technique. In an exemplary embodiment of the present invention, the value of K is optimized using Minimum Description Length Principle. The value of K is a function of records in the corresponding dataset. The value of K is representative of minimum number of records in the corresponding dataset. In the exemplary embodiment of the present invention, where the dataset is associated with loan applications, the dataset includes substantially 850000 records associated with loan approval and amount approved. The data assessment engine 108 uses an optimal sampling technique to identify 18160 minimum relevant records. The data assessment engine 108 derives the nucleus for the entire dataset and each of the time-ordered datasets by processing the corresponding minimum number of features and minimum number of records. In the exemplary embodiment of the present invention, where the dataset includes 74 features and 850000 records, the derived nucleus for the entire dataset is 51 features and 18160 records.

In various embodiments of the present invention, the data assessment engine 108 is configured to evaluate a relevancy value and a redundancy value of each of the time-ordered datasets. In particular, the data assessment engine 108 evaluates the relevancy of each of the time-ordered datasets as exemplified below:

Relevancy of any dataset=(features in the corresponding derived nucleus)/(total features in the corresponding dataset)

The data assessment engine 108 evaluates the redundancy value of each of the time-ordered datasets as exemplified below:

Redundancy of any dataset=(total features in the dataset−features in the corresponding derived nucleus)/(total features in the dataset)

In the exemplary embodiment of the present invention, where the dataset includes 74 features and 850000 records and the derived nucleus for the entire dataset is 51 features and 18160 records, Relevancy=51/74=0.68

Redundancy=(74−51)/74=0.31

In various embodiments of the present invention, the data assessment engine 108 is configured to compute complexity and noise associated with each of the plurality of time-ordered datasets. In an exemplary embodiment of the present invention, the data assessment engine 108 uses a principle graph and manifold technique on each of the nucleus derived from corresponding time-ordered datasets. The data assessment engine 108 computes an energy of the principle manifold as an elastic membrane for each of the nucleus derived from corresponding time-ordered datasets. The energy of the principle manifold for the nucleus corresponding to any time-ordered dataset is representative of the complexity of that dataset.

In an exemplary embodiment of the present invention, the manifold is represented as a graph. In operation, an elastic net is defined for each of the nucleus derived from corresponding time-ordered datasets as an unordered graph G(Y, E), where $Y=\{y^{(i)}, i=1 \ldots p\}$ denotes the collection of graph nodes, and $E=\{E^{(i)}, i=1 \ldots s\}$ denotes collection of graph edges. Some of the incident edges are combined in pairs $R^{(i)}=\{E^{(i)}, E^{(k)}\}$ and are denoted by $R=\{R^{(i)}, i=1 \ldots r\}$ the collection of elementary ribs. Every edge $E^{(i)}$ has a beginning node $E^{(i)}(0)$ and an ending node $E^{(i)}(1)$. An elementary rib is a pair of incident edges having a beginning node $R^{(i)}(1)$, an ending node $R^{(i)}(2)$ and a central node $R^{(i)}(0)$. The underlying manifold for each nucleus is estimated using a graph of nodes(y) and edges (E) such that it explains maximum variance in data.

The data assessment engine 108 computes the energy of the graph G(Y,E) for each nucleus derived from corresponding time-ordered dataset as exemplified below:

$E=U^{(Y)}+U^{(E)}+U^{(R)}$, where $U^{(Y)}$, $U^{(E)}$ and $U^{(R)}$ are energies of individual node, edge and ribs in the graph, with optimized weights.

$$U^{(Y)} = \frac{1}{\Sigma_{x(j)} w_j} \Sigma_{i=1}^{p} \Sigma_{x(j) \in K^{(i)}} w_j \|x^{(j)} - y^{(i)}\|^2;$$

$$U^{(E)} = \Sigma_{i=1}^{s} \lambda_i \|E^{(i)}(1) - E^{(i)}(0)\|^2;$$

$$U^{(R)} = \Sigma_{i=1}^{r} \mu_i \|R^{(i)}(1) + R^{(i)}(0) - 2R^{(i)}(0)\|^2;$$

The $U^{(Y)}$ term is the usual average weighted square of distances between $Y^{(i)}$ and data points in $K^{(i)}$; $U^{(E)}$ is the analogue of energy of elastic stretching and $U^{(R)}$ is the analogue of energy of elastic bending of the net.

$K^{(i)}$, i=1 . . . p is the sub-collection of data points, $$K^{(i)} = \{x^{(j)} : \|x^{(j)} - \|s\|x^{(j)} y^{(m)}\|, \text{ for all } m=1, \ldots, p\}$$

Values $\lambda_i$ and $\mu_j$ are coefficients of stretching elasticity of every edge $E^{(i)}$ and of bending elasticity of every rib $R^{(j)}$. In the simplest case we have $\lambda 1 = \lambda 2 = \ldots = \lambda s = \lambda(s)$, $\mu 1 = \mu 2 = \ldots = \mu r = \mu(r)$.

Further, the mean square of approximation error associated with the energy of the principle manifold for a nucleus of a dataset is representative of the noise for that dataset. In particular, the error associated with a nucleus of a dataset is computed as the distance of a record to the closest node in the graph associated with that nucleus. The mean square of the computed error is calculated which is representative of noise for that dataset.

In various embodiments of the present invention, the data assessment engine 108 is configured to evaluate a DIQ value for each of the time-ordered datasets using the relevancy, redundancy, complexity and noise associated with respective datasets. In particular, the data assessment engine 108 scales each of four variables: relevancy, redundancy, complexity and noise associated with each time-ordered dataset. In an exemplary embodiment of the present invention, each variable is scaled by dividing the individual values of that variable by the sum of all values of that variable to establish relative strength.

Further, the data assessment engine 108 computes a coefficient (t) associated with each time-ordered dataset as a linear combination of the corresponding scaled variables, where relevancy and complexity are additive and redundancy and noise are subtractive factors.

Finally, the data assessment engine 108, evaluates a DIQ value for each time-ordered dataset as exemplified below:

DIQ of any dataset=$1/(1+e^{-t})$, where (t) is the coefficient value associated with that dataset In various embodiments of the present invention, the value of DIQ associated with the dataset is representative of readiness of dataset for data science and analytics of that dataset. Furthermore, higher value of DIQ is representative of effectively using the dataset for data science and analytics to achieve the desired results. The data assessment engine 108 analyses the DIQ value associated with each of the time-ordered datasets to categorize each dataset based on readiness. In an exemplary embodiment of the present invention, the data assessment engine 108, classifies the dataset as a ready dataset if the DIQ value is within 65-100 and transmits a notification on the I/O terminal device 104 to proceed with further analytics and modelling. The data assessment engine 108, classifies the dataset as moderately ready dataset if the DIQ value is within 35-65 and transmits a notification on the I/O terminal device 104 to improve the readiness of dataset. Further, the data assessment engine 108, classifies the dataset as a bad dataset if the DIQ value is within 0-35 and transmits a notification on the I/O terminal device 104 to reject the dataset.

Figure 2:
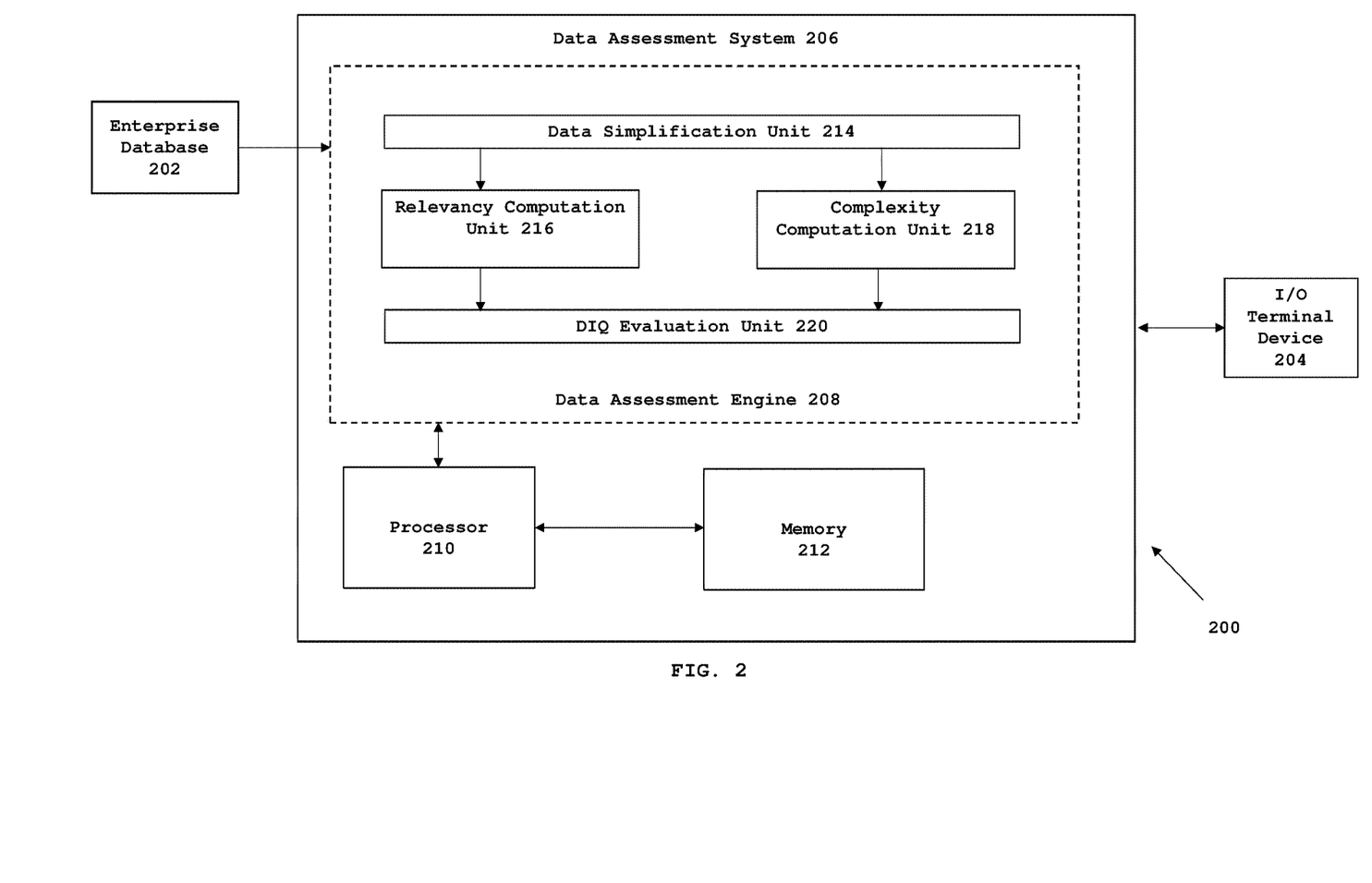
FIG. 2 illustrates a detailed block diagram of a system for assessing readiness of data for data science and analytics, in accordance with an embodiment of the present invention.

FIG. 2 illustrates a detailed block diagram of a system for assessing readiness of data for data science and analytics, in accordance with an embodiment of the present invention.

Referring to FIG. 2, the data assessment engine 206 interfaces with an enterprise database 202 and an input/output (I/O) terminal device 204. The data assessment engine 206 interfaces with the enterprise database 202 to retrieve a dataset. The data assessment engine 206 interfaces with the I/O device 204 to receive inputs such as selection of database, selection of datasets, selection of a time series or any other input and output results associated with readiness of the dataset.

The data assessment engine 206 comprises a data assessment engine 208, a processor 210 and a memory 212. In various embodiments of the present invention, the data assessment engine 206 has multiple units which work in conjunction with each other for assessing readiness of data for data science and analytics. The various units of the data assessment engine 208 are operated via the processor 210 specifically programmed to execute instructions stored in the memory 212 for executing respective functionalities of the units of the system 206 in accordance with various embodiments of the present invention.

In an embodiment of the present invention, the data assessment engine 208 comprises a data simplification unit 214, a relevancy computation unit 216, a complexity computation unit 218, and a DIQ evaluation unit 220.

In various embodiments of the present invention, the data simplification unit 214 is configured to retrieve a dataset from the enterprise database 202. Further, data simplification unit 214 analyses the dataset to compute a period of collection of the data. The period of collection of the data is representative of the overall time frame for which the data is collected. Further, data simplification unit 214 generates a plurality of time-ordered datasets by dividing the retrieved dataset based on a selected time series. For E.g.: if the dataset is prepared over a period of 1 year, the dataset may be divided into 12 datasets based on the month of preparation of the dataset. In an exemplary embodiment of the present invention, the time series may be selected via the input/output terminal device 204.

The data simplification unit 214 is configured to derive a nucleus of the entire dataset as retrieved from the enterprise database 202. The nucleus is representative of minimum number of relevant records and features of the dataset. The nucleus derived from the entire dataset minimizes storage and computational complexity, and hence reduces the turnaround time for each modelling exercise which is performed after the dataset is approved for further analysis based on DIQ value.

Further, the data simplification unit 214 is configured to derive a nucleus for each of the plurality of time-ordered datasets. Each nucleus is representative of minimum number of relevant records and features of corresponding time-ordered dataset. In operation, the data simplification unit 214 derives nucleus for the entire dataset and each of the time-ordered datasets by using a combination of unsupervised feature selection technique and an optimal sampling technique. In an exemplary embodiment of the present invention, the data simplification unit 214 uses the unsupervised feature selection technique to minimize the number of features in the entire dataset and each of the plurality of time ordered datasets. In the exemplary embodiment of the present invention, where the dataset is associated with loan applications, the dataset includes 74 features associated with the loan approval and amount approved. The data assessment engine 108 uses an unsupervised feature selection technique to identify 51 minimum relevant features.

In an embodiment of the present invention, the data simplification unit 214 uses the optimal sampling technique to minimize the number of records in the entire dataset and each of the plurality of time ordered datasets. In an exemplary embodiment of the present invention, the data simplification unit 214 computes an integer (K) using K Medoid clustering technique. Further, the value of K is optimized using minimum description length principle. The value of K is a function of records in the corresponding dataset. The value of K is representative of minimum number of records in the corresponding dataset. In the exemplary embodiment of the present invention, where the dataset is associated with loan applications, the dataset includes substantially 850000 records associated with the loan approval and amount approved. The data assessment engine 108 uses an optimal sampling technique to identify 18160 minimum relevant records. The data simplification unit 214 derives the nucleus for the entire dataset and each of the time-ordered datasets by processing the corresponding minimum number of features and minimum number of records. In the exemplary embodiment of the present invention, where the dataset includes 74 features and 850000 records, the derived nucleus for the entire dataset is 51 features and 18160 records.

In an embodiment of the present invention, the relevancy computation unit 216 is configured to receive the nucleus of each of the time-ordered datasets from the data simplification unit 214. The relevancy computation unit 216 is configured to evaluate a relevancy value and a redundancy value of each of the time-ordered datasets. In particular, the relevancy computation unit 216 evaluates the relevancy value of each of the time-ordered datasets as exemplified below:

Relevancy of any dataset=(features in the corresponding derived nucleus)/(total features in the corresponding dataset)

The relevancy computation unit 216 evaluates the redundancy value of each of the time-ordered datasets as exemplified below:

Redundancy of any dataset=(total features in the dataset−features in the corresponding derived nucleus)/(total features in the dataset)

In the exemplary embodiment of the present invention, where the dataset includes 74 features and 850000 records and the derived nucleus for the entire dataset is 51 features and 18160 records, Relevancy=51/74=0.68

Redundancy=(74−51)/74=0.31

In an embodiment of the present invention, the complexity computation unit 218 is configured to receive the nucleus of each of the time-ordered datasets from the data simplification unit 214. The complexity computation unit 218 is configured to compute a complexity and noise associated with each of the time-ordered datasets. In an exemplary embodiment of the present invention, the complexity computation unit 218 uses a principle graph and manifold technique on each of the nucleus derived from corresponding time-ordered datasets. The complexity computation unit 218 computes an energy of the principle manifold as an elastic membrane for each of the nucleus derived from corresponding time-ordered datasets. The energy of the principle manifold for the nucleus corresponding to any time-ordered dataset is representative of the complexity of that dataset.

In an exemplary embodiment of the present invention, the manifold is represented as a graph. In operation, an elastic net is defined for each of the nucleus derived from corresponding time-ordered datasets as an unordered graph $G(Y, E)$, where $Y=\{y^{(i)}, i=1 \ldots p\}$ denotes the collection of graph nodes, and $E=\{E^{(i)}, i=1 \ldots s\}$. Some of the incident edges are combined in pairs $R^{(i)}=\{E^{(i)}, E^{(k)}\}$ and are denoted by $R=\{R^{(i)}, i=1 \ldots r\}$ the collection of elementary ribs. Every edge $E^{(i)}$ has a beginning node $E^{(i)}(0)$ and an ending node $E^{(i)}(1)$. An elementary rib is a pair of incident edges having a beginning node $R^{(i)}(1)$, an ending node $R^{(i)}(2)$ and a central node $R^{(i)}(0)$. The underlying manifold for each nucleus is estimated using a graph of nodes(y) and edges (E) such that it explains maximum variance in data The complexity computation unit 218 computes the energy of the graph G(Y,E) for each nucleus derived from corresponding time-ordered dataset as exemplified below:

$E = U^{(Y)} + U^{(E)} + U^{(R)}$, where $U^{(Y)}$, $U^{(E)}$ and $U^{(R)}$ are energies of individual node, edge and ribs in the graph, with optimized weights.

$$U^{(Y)} = \frac{1}{\sum_{x_{(j)}} w_j} \Sigma_{i=1}^{p} \Sigma_{x(j) \in K(i)} w_j \|x^{(j)} - y^{(i)}\|^2;$$

$$U^{(E)} = \Sigma_{i=1}^{s} \lambda_i \|E^{(i)}(1) - E^{(i)}(0)\|^2;$$

$$U^{(R)} = \Sigma_{i=1}^{r} \mu_i \|R^{(i)}(1) + R^{(i)}(0) - 2R^{(i)}(0)\|^2;$$

The $U^{(Y)}$ term is the usual average weighted square of distances between $Y^{(i)}$ and data points in $K^{(i)}$; $U^{(E)}$ is the analogue of energy of elastic stretching and $U^{(R)}$ is the analogue of energy of elastic bending of the net.

$K^{(i)}$, $i=1 \ldots p$ is the sub-collection of data points, $$K^{(i)} = \{x^{(j)}: \|x^{(j)} - y^{(i)}\| \le \|x^{(j)} - y^{(m)}\|, \text{ for all } m=1, \ldots, p\}$$

Values $\lambda_i$ and $\mu_j$ are coefficients of stretching elasticity of every edge $E^{(i)}$ and of bending elasticity of every rib $R^{(j)}$. In the simplest case we have $\lambda 1 = \lambda 2 = \ldots = \lambda s = \lambda(s)$, $\mu 1 = \mu 2 = \ldots = \mu r = \mu(r)$.

Further, the approximation error associated with the energy of the principle manifold for a nucleus of a dataset is representative of the noise for that dataset. In particular, the error associated with a nucleus of a dataset is computed as the distance of a record to the closest node in the graph associated with that nucleus. The mean square of the computed error is calculated which is representative of noise for that dataset.

In an embodiment of the present invention, the DIQ evaluation unit 220 is configured to receive the relevancy and redundancy of each of the time-ordered datasets from the relevancy computation unit 216. Further, the DIQ evaluation unit 220 is configured to receive the complexity and noise associated with each of the time-ordered datasets from the complexity computation unit. The DIQ evaluation unit 220 is configured to evaluate a DIQ value for each of the time-ordered datasets using the relevancy, redundancy, complexity and noise associated with respective datasets. In particular, the DIQ evaluation unit 220 scales each of four variables: relevancy, redundancy, complexity and noise associated with each time-ordered dataset. In an exemplary embodiment of the present invention, each variable is scaled by dividing the individual values of that variable by the sum of all values of that variable to establish relative strength.

Further, the DIQ evaluation unit 220 computes a coefficient (t) associated with each time-ordered dataset as a linear combination of the corresponding scaled variables, where relevancy and complexity are additive and redundancy and noise are subtractive factors. Finally, the DIQ evaluation unit 220, evaluates a DIQ value for each time-ordered dataset as exemplified below:

DIQ of any dataset=$1/(1+e^{-t})$, where (t) is the coefficient value associated with that dataset In various embodiments of the present invention, the value of DIQ associated with the dataset is representative of readiness of the dataset for data science and analytics of that dataset. Furthermore, higher value of DIQ is representative of effectively using the dataset for data science and analytics to achieve the desired results. The DIQ evaluation unit 220 analyses the DIQ value associated with each of the time-ordered datasets to categorize each dataset based on readiness. In an exemplary embodiment of the present invention, the DIQ evaluation unit 220, classifies the dataset as a ready dataset if the DIQ value is within 65-100 and transmits a notification on the I/O terminal device 204 to proceed with further analytics and modelling. The DIQ evaluation unit 220, classifies the dataset as moderately ready dataset if the DIQ value is within 35-65 and transmits a notification on the I/O terminal device 104 to improve the readiness of dataset. Further, the DIQ evaluation unit 220, classifies the dataset as a bad dataset if the DIQ value is within 0-35 and transmits a notification on the I/O terminal device 204 to reject the dataset.

Figure 3:
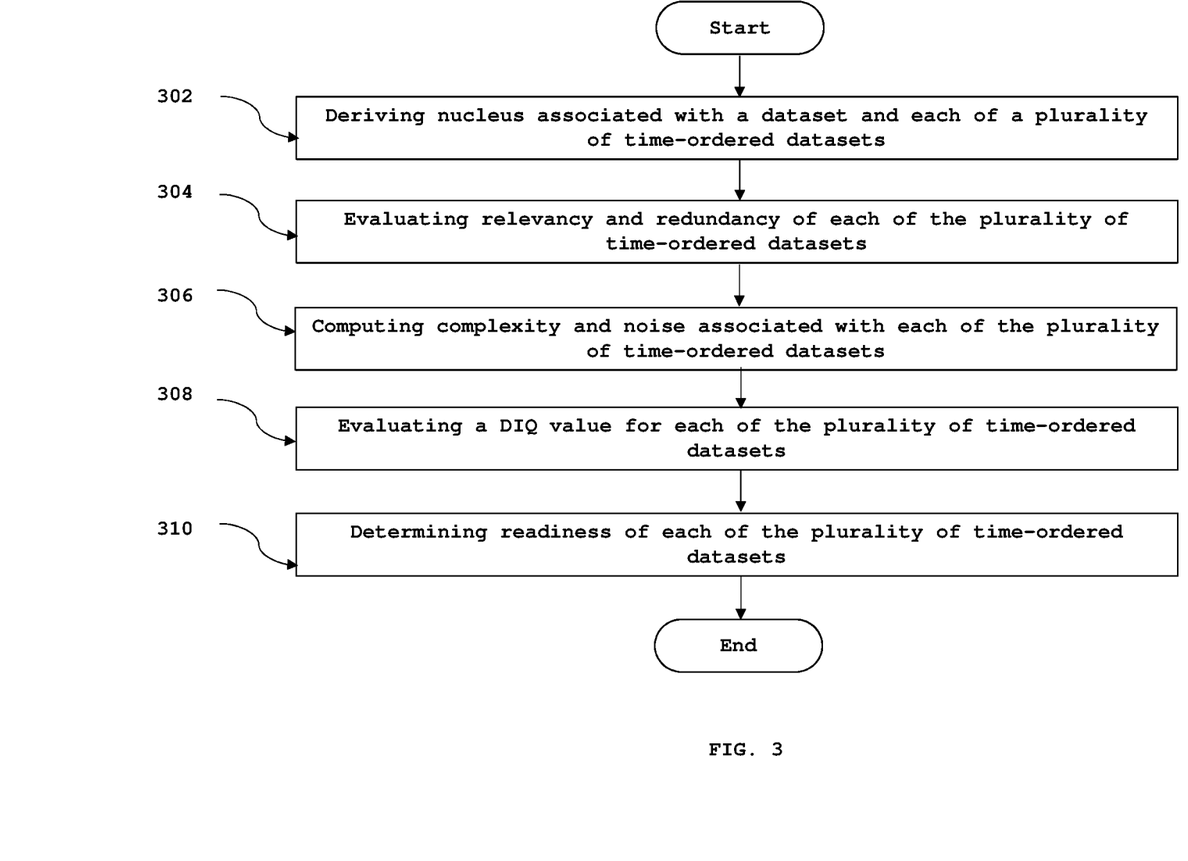
FIG. 3 is a flowchart illustrating a method for assessing readiness of data for data science and analytics, in accordance with an embodiment of the present invention.

FIG. 3 is a flowchart illustrating a method for assessing readiness of data for data science and analytics, in accordance with an embodiment of the present invention.

At step 302, nucleus associated with a dataset and each of the plurality of time-ordered datasets is derived. In an embodiment of the present invention, a dataset is retrieved from an enterprise database. The dataset is analyzed to compute a period of collection of the data. The period of collection of the data is representative of the overall time frame for which the data is collected. Further, a plurality of time-ordered datasets are generated by dividing the retrieved dataset based on a selected time series. In an exemplary embodiment of the present invention, the time-series may be selected via a terminal device. For E.g.: if the dataset is prepared over a period of 1 year, the dataset may be divided into 12 datasets based on the month of preparation of the dataset.

Further, a nucleus of the entire dataset is derived, which is representative of minimum number of relevant records and features of the dataset. The nucleus derived from the entire dataset minimizes storage and computational complexity, and hence reduces the turnaround time for each modelling exercise which is performed after the dataset is approved for further analysis based on DIQ value.

A nucleus is derived for each of the time-ordered datasets respectively. Each nucleus is representative of minimum number of relevant records and features of corresponding time-ordered dataset. In operation, the nucleus for the entire dataset and each of the time-ordered datasets is derived by using a combination of unsupervised feature selection technique and an optimal sampling technique. In an exemplary embodiment of the present invention, the unsupervised feature selection technique is used to minimize the number of features in the entire dataset and each of the plurality of time ordered datasets. In an exemplary embodiment of the present invention, where the dataset is associated with loan applications, the dataset includes 74 features associated with the loan approval and amount approved. The unsupervised feature selection technique is used to identify 51 minimum relevant features.

Further, the optimal sampling technique is used to minimize the number of records in the entire dataset and each of the plurality of time ordered datasets. In an exemplary embodiment of the present invention, an integer (K) is computed using K Medoid clustering technique. In an exemplary embodiment of the present invention, the value of K is optimized using Minimum Description Length Principle. The value of K is a function of records in the corresponding dataset. The value of K is representative of minimum number of records in the corresponding dataset. In the exemplary embodiment of the present invention, where the dataset is associated with loan applications, the dataset includes substantially 850000 records associated with the loan approval and amount approved. The optimal sampling technique is used to identify 18160 minimum relevant records. The nucleus for the entire dataset and each of the time-ordered datasets is derived by processing the corresponding minimum number of features and minimum number of records. In the exemplary embodiment of the present invention, where the dataset includes 74 features and 850000 records, the derived nucleus for the entire dataset is 51 features and 18160 records.

At step 304, relevancy and redundancy of each of the plurality of time-ordered datasets evaluated. In an embodiment of the present invention, the relevancy value of each of the time-ordered datasets is evaluated as exemplified below:

Relevancy of any dataset=(features in the corresponding derived nucleus)/(total features in the corresponding data set)

The redundancy value of each of the time-ordered datasets is evaluated is evaluated as exemplified below:

Redundancy of any dataset=(total features in the data set−features in the corresponding derived nucleus)/(total features in the data set)

In the exemplary embodiment of the present invention, where the dataset includes 74 features and 850000 records and the derived nucleus for the entire dataset is 51 features and 18160 records, Relevancy=51/74=0.68

Redundancy=(74−51)/74=0.31

At step 306, a complexity and noise associated with each of the plurality of time-ordered datasets is computed. In an exemplary embodiment of the present invention, a principle graph and manifold technique is used on each of the nucleus derived from corresponding time-ordered datasets. An energy of the principle manifold as an elastic membrane is computed for each of the nucleus derived from corresponding time-ordered datasets. The energy of the principle manifold for the nucleus corresponding to any time-ordered dataset is representative of the complexity of that dataset.

In an exemplary embodiment of the present invention, the manifold is represented as a graph. In operation, an elastic net is defined for each of the nucleus derived from corresponding time-ordered datasets as an unordered graph $G(Y, E)$, where $Y=\{y^{(i)}, i=1 \ldots \}$ denotes the collection of graph nodes, and $E=\{E^{(i)}, i=1 \ldots s\}$. Some of the incident edges are combined in pairs $R^{(i)}=\{E^{(i)}, E^{(k)}\}$ and are denoted by $R=\{R^{(i)}, i=1 \ldots r\}$ the collection of elementary ribs. Every edge $E^{(i)}$ has a beginning node $E^{(i)}(0)$ and an ending node $E^{(i)}(1)$. An elementary rib is a pair of incident edges having a beginning node $R^{(i)}(1)$, an ending node $R^{(i)}(2)$ and a central node $R^{(i)}(0)$. The underlying manifold for each nucleus is estimated using a graph of nodes(y) and edges (E) such that it explains maximum variance in data.

The energy of the graph $G(Y,E)$ is computed for each of the nucleus derived from corresponding time-ordered datasets as exemplified below:

$E=U^{(Y)}+U^{(E)}+U^{(R)}$, where $U^{(Y)}$, $U^{(E)}$ and $U^{(R)}$ are energies of individual node, edge and ribs in the graph, with optimized weights.

$$U^{(Y)} = \frac{1}{\sum_{x_{(j)}} w_j} \Sigma_{i=1}^{p} \Sigma_{x^{(j)} \in K^{(i)}} w_j \|x^{(j)} - y^{(i)}\|^2;$$

$$U^{(E)} = \Sigma_{i=1}^{s} \lambda_i \|E^{(i)}(1) - E^{(i)}(0)\|^2;$$

$$U^{(R)} = \Sigma_{i=1}^{r} \mu_i \|R^{(i)}(1) + R^{(i)}(0) - 2R^{(i)}(0)\|^2;$$

The $U^{(Y)}$ term is the usual average weighted square of distances between $Y^{(i)}$ and data points in $K^{(i)}$; $U^{(E)}$ is the analogue of energy of elastic stretching and $U^{(R)}$ is the analogue of energy of elastic bending of the net.

$K^{(i)}$, i=1 . . . p is the sub-collection of data points, $$K^{(i)} = \{x^{(j)} : \|x^{(j)} - y^{(i)}\| \leq \|x^{(j)} - y^{(m)}\|, \text{ for all } m=1, \ldots, p\}$$

Values $\lambda_i$ and $\mu_j$ are coefficients of stretching elasticity of every edge $E^{(i)}$ and of bending elasticity of every rib $R^{(j)}$. In the simplest case we have $\lambda 1 = \lambda 2 = \ldots = \lambda s = \lambda(s)$, $\mu 1 = \mu 2 = \ldots = \mu r = \mu(r)$.

Further, the approximation error associated with the energy of the principle manifold for a nucleus of a dataset is representative of the noise for that dataset. In particular, the error associated with a nucleus of a dataset is computed as the distance of a record to the closest node in the graph associated with that nucleus. The mean square of the computed error is calculated which is representative of noise for that dataset.

At step 308, a data insight quotient (DIQ) value for each of the plurality of time-ordered datasets is evaluated. In particular, in an embodiment of the present invention, each of the four variables: relevancy, redundancy, complexity and noise associated with each time-ordered dataset are scaled. Thereafter, the DIQ value associated with respective datasets is evaluated as a function of relevancy, redundancy, complexity and noise associated with corresponding datasets. In an exemplary embodiment of the present invention, each variable is scaled by dividing the individual values of that variable by the sum of all values of that variable to establish relative strength.

Further, a coefficient (t) associated with each time-ordered dataset is computed as a linear combination of the corresponding scaled variables, where relevancy and complexity are additive and redundancy and noise are subtractive factors.

Finally, a DIQ value for each time-ordered dataset is evaluated as exemplified below:

DIQ of any dataset=$1/(1+e^{-t})$, where (t) is the coefficient value associated with that dataset At step 310, readiness of each of the plurality of time-ordered datasets is determined. In various embodiments of the present invention, the value of DIQ associated with the dataset is representative of readiness of that dataset. The readiness of dataset is representative of ability of data for performing descriptive, diagnostic, predictive and prescriptive analytics to derive desired results. Furthermore, higher value of DIQ is representative of effectively using the dataset for data science and analytics to achieve the desired results. The DIQ value associated with each of the time-ordered datasets is analyzed to categorize each dataset based on readiness. In an exemplary embodiment of the present invention, the dataset is classified as a ready dataset if the DIQ value is within 65-100 and a notification is transmitted to an I/O terminal device to proceed with further analytics and modelling. The dataset is classified as moderately ready dataset if the DIQ value is within 35-65 and a notification is transmitted to the I/O terminal device to improve the readiness of dataset. Further, the dataset is classified as a bad dataset if the DIQ value is within 0-35 and a notification is transmitted to the I/O terminal device to reject the dataset.

Figure 4:
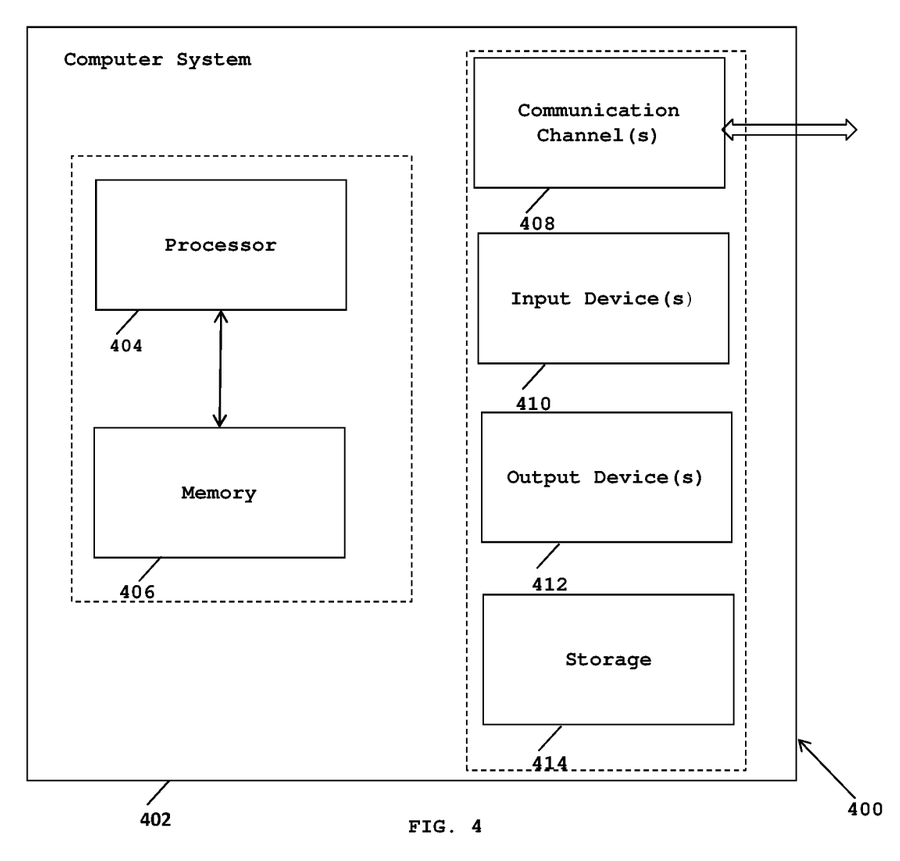
FIG. 4 illustrates an exemplary computer system in which various embodiments of the present invention may be implemented.

FIG. 4 illustrates an exemplary computer system in which various embodiments of the present invention may be implemented. The computer system 402 comprises a processor 404 and a memory 406. The processor 404 executes program instructions and is a real processor. The computer system 402 is not intended to suggest any limitation as to scope of use or functionality of described embodiments. For example, the computer system 402 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 406 may store software for implementing various embodiments of the present invention. The computer system 402 may have additional components. For example, the computer system 402 includes one or more communication channels 408, one or more input devices 410, one or more output devices 412, and storage 414. An interconnection mechanism (not shown) such as a bus, controller, or network, interconnects the components of the computer system 402. In various embodiments of the present invention, operating system software (not shown) provides an operating environment for various softwares executing in the computer system 402, and manages different functionalities of the components of the computer system 402.

The communication channel(s) 408 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 410 may include, but not limited to, a keyboard, mouse, pen, joystick, trackball, a voice device, a scanning device, touch screen or any another device that is capable of providing input to the computer system 402. In an embodiment of the present invention, the input device(s) 410 may be a sound card or similar device that accepts audio input in analog or digital form. The output device(s) 412 may include, but not limited to, a user interface on CRT or LCD, printer, speaker, CD/DVD writer, or any other device that provides output from the computer system 402.

The storage 414 may include, but not limited to, magnetic disks, magnetic tapes, CD-ROMs, CD-RWs, DVDs, flash drives or any other medium which can be used to store information and can be accessed by the computer system 402. In various embodiments of the present invention, the storage 414 contains program instructions for implementing the described embodiments.

The present invention may suitably be embodied as a computer program product for use with the computer system 402. The method described herein is typically implemented as a computer program product, comprising a set of program instructions which is executed by the computer system 402 or any other similar device. The set of program instructions may be a series of computer readable codes stored on a tangible medium, such as a computer readable storage medium (storage 414), for example, diskette, CD-ROM, ROM, flash drives or hard disk, or transmittable to the computer system 402, via a modem or other interface device, over either a tangible medium, including but not limited to optical or analogue communications channel(s) 408. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention.

We claim:

1. A method for assessing readiness of data for data science and analytics, wherein the method is implemented by at least one processor executing program instructions stored in a memory, the method comprising:
    deriving, by the processor, a nucleus associated with a dataset and a plurality of time-ordered datasets respectively, wherein each nucleus is representative of minimum number of relevant records and features of corresponding dataset;
    evaluating, by the processor, a redundancy value and a relevancy value of each of the plurality of time-ordered datasets;
    evaluating, by the processor, complexity and noise associated with each of the plurality of time-ordered datasets;
    evaluating, by the processor, a data insight quotient (DIQ) value for each of the plurality of time-ordered datasets as a function of the relevancy, the redundancy, the complexity and the noise associated with corresponding datasets; and
    determining, by the processor, readiness of each of the plurality of time-ordered datasets based on the DIQ value, wherein readiness of data is representative of ability of data for performing analytics to derive desired results.

2. The method as claimed in claim 1, wherein deriving the nucleus associated with the dataset and the plurality of time-ordered datasets respectively, comprises:
    analyzing the dataset retrieved from an enterprise database to compute a period of collection of the data, wherein the period of collection of the data is representative of the overall time frame for which the data is collected;
    generating the plurality of time-ordered datasets by dividing the retrieved dataset based on a selected time series;
    deriving the nucleus for the dataset and each of the plurality of time-ordered datasets respectively by using a combination of unsupervised feature selection technique and optimal sampling technique.

3. The method as claimed in claim 1, wherein relevancy of any time-ordered dataset is derived based on features in the corresponding nucleus and total features in the corresponding dataset.

4. The method as claimed in claim 1, wherein redundancy of any time-ordered dataset is derived by computing a difference between total features in the time-ordered data set and features in the corresponding nucleus, and diving the computed difference by total features in the time-ordered dataset.

5. The method as claimed in claim 1, wherein complexity and noise associated with each of the plurality of time-ordered datasets is evaluated by using a principle graph and manifold technique on each of the nucleus derived from corresponding time-ordered datasets, wherein complexity associated with any time-ordered dataset is the energy of a manifold derived using the nucleus corresponding to the time-ordered dataset.

6. The method as claimed in claim 5, wherein noise associated with any time-ordered dataset is approximation error associated with the energy of the manifold derived using the nucleus corresponding to the time-ordered dataset.

7. The method as claimed in claim 1, wherein evaluating the data insight quotient (DIQ) value for each of the plurality of time-ordered datasets comprises:
    scaling each variable: relevancy, redundancy, complexity and noise associated with each time-ordered dataset, wherein each variable is scaled by dividing individual values of that variable by the sum of all values of that variable to establish relative strength;
    computing a coefficient (t) associated with each time-ordered dataset as a linear combination of the corresponding scaled variables, wherein relevancy and complexity are additive and redundancy and noise are subtractive factors; and
    evaluating a DIQ value for each time-ordered dataset using the equation $DIQ=1/(1+e\hat{\,}-t)$, where (t) is the coefficient value for corresponding time-ordered dataset.

8. The method as claimed in claim 1, wherein determining readiness of each of the plurality of time-ordered datasets comprises:
    classifying the time-ordered dataset as a ready dataset if the DIQ value is within 65-100 and transmitting a notification to an Input/output terminal device to proceed with further analytics and modelling;
    classifying the time-ordered dataset as moderately ready dataset if the DIQ value is within 35-65 and transmitting a notification to the Input/output terminal device to improve the readiness of dataset; and
    classifying the time-ordered dataset as a bad dataset if the DIQ value is within 0-35 and transmitting a notification to the Input/output terminal device to reject the dataset.

9. A system for assessing readiness of data for data science and analytics, the system comprising:
    a memory storing program instructions; a processor configured to execute program instructions stored in the memory; and a data assessment engine in communication with the processor and configured to:
    derive a nucleus associated with a dataset and a plurality of time-ordered datasets respectively, wherein each nucleus is representative of minimum number of relevant records and features of corresponding dataset;
    evaluate a redundancy value and a relevancy value of each of the plurality of time-ordered datasets;
    evaluate a complexity and noise associated with each of the plurality of time-ordered datasets;
    evaluate a data insight quotient (DIQ) value for each of the plurality of time-ordered datasets as a function of the relevancy, the redundancy, the complexity and the noise associated with corresponding datasets; and
    determine readiness of each of the plurality of time-ordered datasets based on the DIQ value, wherein readiness of data is representative of ability of data for performing analytics to derive desired results.

10. The system as claimed in claim 9, wherein the data assessment engine comprises a data simplification unit in communication with the processor, said data simplification unit interfaces with an enterprise database and is configured to:
  analyze the dataset retrieved from the enterprise database to compute a period of collection of the data, wherein the period of collection of the data is representative of the overall time frame for which the data is collected;
  generate the plurality of time-ordered datasets by dividing the retrieved dataset based on a selected time series;
  derive the nucleus for the dataset and each of the plurality of time-ordered datasets respectively by using a combination of unsupervised feature selection technique and optimal sampling technique.

11. The system as claimed in claim 9, wherein the data assessment engine comprises a relevancy computation unit in communication with the processor, said relevancy computation unit configured to evaluate the redundancy value and the relevancy value of each of the plurality of time-ordered datasets, wherein relevancy of any time-ordered dataset is derived based on features in the corresponding nucleus and total features in the corresponding dataset and redundancy of any time-ordered dataset is derived by computing a difference between total features in the time-ordered data set and features in the corresponding nucleus, and diving the computed difference by total features in the time-ordered dataset.

12. The system as claimed in claim 9, wherein the data assessment engine comprises a complexity computation unit in communication with the processor, said complexity computation unit configured to evaluate complexity and noise associated with each of the plurality of time-ordered datasets by using the principle graph and manifold technique on each of the nucleus derived from corresponding time-ordered datasets, wherein complexity associated with any time-ordered dataset is the energy of a manifold derived using the nucleus corresponding to the time-ordered dataset and noise associated with any time-ordered dataset is approximation error associated with the energy of the manifold derived using the nucleus corresponding to the time-ordered dataset.

13. The system as claimed in claim 9, wherein the data assessment engine comprises a DIQ evaluation unit in communication with the processor, said DIQ evaluation unit configured to evaluate the data insight quotient (DIQ) value for each of the plurality of time-ordered datasets by:
  scaling each variable: relevancy, redundancy, complexity and noise associated with each time-ordered dataset, wherein each variable is scaled by dividing individual values of that variable by the sum of all values of that variable to establish relative strength;
  computing a coefficient (t) associated with each time-ordered dataset as a linear combination of the corresponding scaled variables, wherein relevancy and complexity are additive and redundancy and noise are subtractive factors; and
  evaluating a DIQ value for each time-ordered dataset using the equation $DIQ=1/(1+e^{-t})$, where (t) is the coefficient value for corresponding time-ordered dataset.

14. The system as claimed in claim 13, wherein the DIQ evaluation unit is configured to determine readiness of each of the plurality of time-ordered datasets by:
  classifying the time-ordered dataset as a ready dataset if the DIQ value is within 65-100 and transmitting a notification to an Input/output terminal device to proceed with further analytics and modelling;
  classifying the time-ordered dataset as moderately ready dataset if the DIQ value is within 35-65 and transmitting a notification to the Input/output terminal device to improve the readiness of dataset; and
  classifying the time-ordered dataset as a bad dataset if the DIQ value is within 0-35 and transmitting a notification to the Input/output terminal device to reject the dataset.

15. A computer program product comprising:
  a non-transitory computer-readable medium having computer-readable program code stored thereon, the computer-readable program code comprising instructions that, when executed by a processor, cause the processor to:
  derive a nucleus associated with a dataset and a plurality of time-ordered datasets respectively, wherein each nucleus is representative of minimum number of relevant records and features of corresponding dataset;
  evaluate a redundancy value and a relevancy value of each of the plurality of time-ordered datasets;
  evaluate a complexity and noise associated with each of the plurality of time-ordered datasets by using a principle graph and manifold technique on each of the nucleus derived from corresponding time-ordered datasets;
  evaluate a data insight quotient (DIQ) value for each of the plurality of time-ordered datasets as a function of the relevancy, the redundancy, the complexity and the noise associated with corresponding datasets; and
  determine readiness of each of the plurality of time-ordered datasets based on the DIQ value, wherein readiness of data is representative of ability of data for performing analytics to derive desired results.

* * * * *